United States Patent
Schaller

(10) Patent No.: US 6,216,881 B1
(45) Date of Patent: *Apr. 17, 2001

(54) HINGED COVER FOR USE IN A CLARIFIER TANK HAVING AN INBOARD LAUNDER CHANNEL CONFIGURATION

(76) Inventor: Earle Schaller, 114 Windward Dr., Palm Beach Gardens, FL (US) 33418

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/124,864

(22) Filed: Jul. 30, 1998

Related U.S. Application Data

(63) Continuation-in-part of application No. 08/927,621, filed on Sep. 11, 1997, now Pat. No. 5,965,023, which is a continuation-in-part of application No. 08/696,358, filed on Aug. 3, 1996, now Pat. No. 5,670,045, which is a continuation of application No. 08/333,411, filed on Nov. 2, 1994, now abandoned.

(51) Int. Cl.[7] ............................................. B01D 21/24
(52) U.S. Cl. ..................... 210/540; 210/541; 210/526; 210/528
(58) Field of Search ......................... 210/602, 800, 210/804, 600, 188, 513, 528, 539, 540, 541, 542, 526, 529; 220/565, 600, 660

(56) References Cited

U.S. PATENT DOCUMENTS

| | | | |
|---|---|---|---|
| 2,509,933 | * 5/1950 | Lind | 210/526 |
| 3,385,786 | 5/1968 | Klock | 210/602 |
| 3,489,287 | * 1/1970 | Streander | 210/526 |
| 4,390,422 | 6/1983 | Mackrle et al. | 210/188 |
| 4,391,704 | 7/1983 | Anderson | 210/589 |
| 4,613,434 | 9/1986 | Määttä | 210/188 |
| 4,664,794 | 5/1987 | Mackrle et al. | 210/188 |
| 4,710,292 | 12/1987 | DeVos | 210/539 |
| 4,767,536 | 8/1988 | Roley | 210/539 |
| 4,830,748 | 5/1989 | Hall | 210/241 |
| 4,876,010 | * 10/1989 | Riddle | 210/528 |
| 5,227,077 | 7/1993 | Shea | 210/188 |
| 5,252,205 | 10/1993 | Schaller | 210/540 |
| 5,286,392 | 2/1994 | Shea | 210/188 |

* cited by examiner

Primary Examiner—Christopher Upton
(74) Attorney, Agent, or Firm—Sofer & Haroun, LLP

(57) ABSTRACT

A cover apparatus for inhibiting the growth of algae on the fluid-contacting surfaces of an inboard launder channel disposed to receive a water flow from a central and from a peripheral region of a water treatment tank and for capturing noxious gases. Cover supports coupled to the sidewalls of the launder channel position the covers above the inboard launder channel and hinge means permit the covers to be pivoted away and toward the launder channel, for accessing the channel. In one embodiment, the inboard launder channel is circular and the covers are disposed above it with a substantially similar radial curvature. In another embodiment, the inboard launder channel is made up of straight sections angled at the end of each section to form a polygon, with fixed cover corner sections disposed in between adjacent straight sections. In still another embodiment, several straight inboard launder channels are parallel to each each other and each empty into a main channel.

11 Claims, 4 Drawing Sheets

HINGED COVER FOR USE IN A CLARIFIER TANK HAVING AN INBOARD LAUNDER CHANNEL CONFIGURATION

RELATED DATA

This application is a continuation-in-part of U.S. patent application Ser. No. 08/927,621, filed Sep. 11, 1997, now U.S. Pat. No. 5,965,023, which is a continuation-in-part of U.S. patent application Ser. No. 08/696,358, filed Aug. 3, 1996, now U.S. Pat. No. 5,670,045, which is a continuation of U.S. patent application Ser. No. 08/333,411 filed Nov. 2, 1994, abandoned, all of which are incorporated by reference herein.

FIELD OF THE INVENTION

The present invention relates generally to the cleaning of sewage treatment facilities and more particularly, to a cover system which inhibits the growth of algae on the surfaces of an inboard launder channel of sedimentation water treatment tanks employed in such facilities as well as a cover system that effects the capture of noxious gases in an inboard launder configuration.

BACKGROUND OF THE INVENTION

The necessity for providing sewage treatment plants to clean and purify water discharged from homes and factories is well known. The function of a sewage treatment facility is to receive raw sewage (water containing waste material) as discharged from a city sewage system and clean it to ultimately produce purified water. This is accomplished through a series of biological and mechanical processes.

In a typical water treatment facility, the raw sewage is received from the sewage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. This sludge is removed for "digestion" by microorganisms. The digested sludge is then dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are circular. This simplifies automatic skimming, churning and/or bottom scraping operations. More specifically, by eliminating inaccessible corners and providing uniform surfaces, a revolving scraper arm or skimmer blade can provide complete and efficient churning and prevent sludge buildup. Water treatment tanks with non-circular configurations are not as common but are also used.

During operation of one type of circular water treatment tank having an inboard launder channel arrangement, water containing sediment enters the tank from influents located in both the central region of the circular tank and the outer perimeter region of the tank. If the launder channel, explained more fully in the next paragraph, does not prevent the water flow between the central region and the outer perimeter region of the tank, then the sediment-containing water can enter the tank from a single influent located anywhere in the tank. In a continuous process, the lighter clean water is effectively decanted from the heavier sediment containing water. More particularly, the clean water is displaced from the tank by the constant flow of sediment-containing water into the tank. The displaced clean water is forced to flow into an inboard launder channel which is disposed about the center of the tank.

The inboard launder channel is configured such that the inner perimeter of the launder channel is located a specified distance radially away from the center of the tank and the outer perimeter of the launder channel is located a greater specified distance away from the center of the tank, but is not contiguous with the outer perimeter of the tank. The resulting configuration permits sediment-containing water entering the tank to displace cleaner water which is forced to flow under the baffle plate and over the weir located at the inner perimeter of the launder channel. The configuration further permits sediment-containing water entering the tank to displace cleaner water which is forced to flow under a baffle plate and over a weir located at the outer perimeter of the launder channel. This system is commonly referred to as an inboard launder channel configuration.

FIG. 5 also shows a non-circular water treatment tank which can also have an inboard launder channel arrangement. In this configuration, sediment-containing water enters the tank and proceeds to displace the clean water into a plurality of parallel launder channels. Each launder channel has both a weir and a scum baffle plate located at each side of the channel.

In the circular tank configuration, the baffle plate and weir, the functions of which will be explained more fully later, are circular in shape when seen in the plan view. As explained previously, they are typically located at the inner and outer perimeters of the launder channel. The displaced clean water ultimately enters the launder channel which directs the water to the next treatment stage where it is chlorinated and further made safe to be discharged into a river or stream.

Presently, algae growth in the launder channel is a serious problem in clarifier tanks. Specifically, as algae builds up on the surfaces of the clarifier tank, particularly on the weirs, it can substantially interfere with the hydraulic flow therethrough. Algae typically adheres to the wet surfaces of the weir and the channel, where it becomes unsightly and odorous. When the launder channel is cleaned, however, the algae is often loosened and causes clogging of the downstream filters.

For many years, the removing of algae from the baffle, weir, spillway and clean water flow channel has been completed primarily by scrubbing the tank structure with brushes manipulated by hand. Because the final treatment tanks are quite large, this is a labor-intensive and tedious process, involving a large expenditure of man-hours. Additionally, the algae removing process must be done frequently, thereby further adding to the cost. The additional time and cost of manually cleaning the baffle, weir and spillway is compounded by the inboard launder configuration, since the inboard launder configuration typically utilizes two scum baffles, weirs and spillways, as opposed to a single baffle, weir and spillway in a conventional configuration. This results in roughly twice the surface area which needs to be kept free of or cleaned of algae build-up. Furthermore, since the inboard launder channel is centrally located in the tank, rather than along the tank's outer perimeter, it is difficult for a worker to manually reach the baffles, weirs and spillways in order to clean them by hand, forcing additional expediture of resources to insure the safety for the workers employed for the task.

More recent proposals directed at the problem of algae growth have utilized mechanical brushes to automate the cleaning process. One such device is disclosed in U.S. Pat. No. 4,830,748. While this apparatus is somewhat effective in cleaning the baffle, weir, spillway and clean water flow channel of a circular tank, it is somewhat limited in application in that it is adapted to be mounted to a revolving skimmer blade. Accordingly, it can only be effectively utilized with circular water treatment tanks, wherein the launder channel is disposed about the outer perimeter of the tank, incorporating such a blade. The cost of obtaining, installing, and maintaining such an automated system, though perhaps preferable to the alternative of periodic manual scrubbing, is also quite high. An inboard launder configuration is even less suitable for this type of mechanical brush operation, since the inner and outer baffles, weirs and spillways would require, in the circular tank configuration, two mechanical brush systems—one which brushed the inner baffle, weir and spillway from the center of the tank, and a second which rotated around the outer perimeter of the tank in order to reach the baffle, weir and spillway located at the outer perimeter of the launder channel. The non-circular tank configuration, due to its irregular shape as shown in FIG. 5, is also unsuitable for a mechanical brush system.

Other waste water facilities have utilized chlorine and other chemicals in sufficient concentrations to kill the algae. However, a large number of waste water facilities utilize a denitrification process that precludes the use of such chemical additives. As such, a need is recognized for a proactive system that inhibits the growth of algae in the inboard launder channel of a clarifier tank.

SUMMARY OF THE INVENTION

It is, therefore, an object of the present invention to provide a cover system which is positionable over an inboard launder channel of a clarifier tank to prevent sunlight from reaching the surfaces of the inboard launder channel. By blocking the sunlight, the cover system of the present invention inhibits the growth of algae on the surfaces of the launder channel and obviates the need for frequent scrubbing or complex automated cleaning devices.

The inventive cover system comprises at least one panel member positionable above the channel, both weirs, and in some embodiments, over the two scum baffles, of a clarifier tank to prevent sunlight from reaching the surfaces thereof. In accordance with one embodiment of the present invention intended for use with a circular inboard launder channel, one or more panel members having an outer radius of curvature corresponding to the radius of curvature of the inboard launder channel may be employed so that the outer edge of the panel member or members may be arranged in a contiguous fashion along the outer sidewall of the inboard launder channel. The outer sidewall of the inboard launder channel is the sidewall which is located a greater radial distance from the center of the circular clarifier tank, as compared to the inner sidewall of the inboard launder channel, as will be fully explained later. Where a plurality of cover panel members are employed, they may be mounted in an end to end abutting fashion such that the lateral side of each cover abuts a lateral side of an adjacent cover. In this manner, the plurality of panel members may be arranged over an entire launder channel to substantially prevent light from reaching the interior surfaces thereof. The cover system of the present invention has application to other launder channel configurations. In another embodiment of the present invention, the cover system of the present invention is configured so as to obviate the need for scum baffles, as the cover system accomplishes an identical function as performed by the scum baffle.

Referring to the mounting of the panel members in an end-to-end fashion as described above, the adjacent-abutting panel members in another embodiment form a smoothly-continuous surface by virtue of a shiplap-type joint through which each panel member are interconnected. This shiplap-type joint allows for the first lateral side of the panel member to be secured to the next adjacent one of said plural panel members so that together they form the smoothly-continuous surface.

Typically, water treatment tanks having a circular inboard launder configuration include an influent for sediment-containing water, a pair of scum baffles, a pair of substantially vertical weirs, a pair of spillways, and a launder channel having a sidewall located at its inner perimeter, another sidewall located at its outer perimeter and a width between the two sidewalls. The first of each of the baffles, weirs and spillways are located at the inner perimeter of the launder channel and are configured to allow into the launder channel from the center region of the clarifier tank the clean water which is displaced by the sediment-containing water. The second of each of the baffles, weirs and spillways are located at the outer perimeter of the launder channel and are configured to allow into the launder channel from the peripheral region of the clarifier tank the clean water which is displaced by the sediment-containing water.

The present invention comprises a cover panel apparatus positionable over the launder channel, for preventing light from reaching interior surfaces thereof, secured to upper edges of the two sidewalls of the inboard launder channel. The cover panel apparatus comprises a first panel member which is dimensioned and arranged to span the width of said launder channel and is comprised of a substantially opaque material. Additional components of the cover panel apparatus which are suitably attached to the first panel member are also secured to the sidewalls of the inboard launder channel, permitting the first cover panel to be fixedly mounted above the launder channel. Similar to the first cover panel member, a plurality of other panel members are dimensioned and arranged to span the width of the launder channel and are comprised of a substantially opaque material. The plurality of panel members, in addition to being secured to the sidewalls of the launder channel in the same fashion as the first panel member, are secured in end-to-end immediately-adjacent relation to the first panel member and to each other so as to completely cover the launder channel.

A further object of the invention is to provide a cover system in which the cover acts to capture noxious gases within the launder channel. The gas is then drawn off or blown out under pressure and sent to a scrubber or to other gas processing apparatus. For this purpose, the joints of the cover must be sealed with a suitable gasket.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numbers denote similar elements throughout the several views.

DETAILED DESCRIPTION OF THE INVENTION

Figure 1:
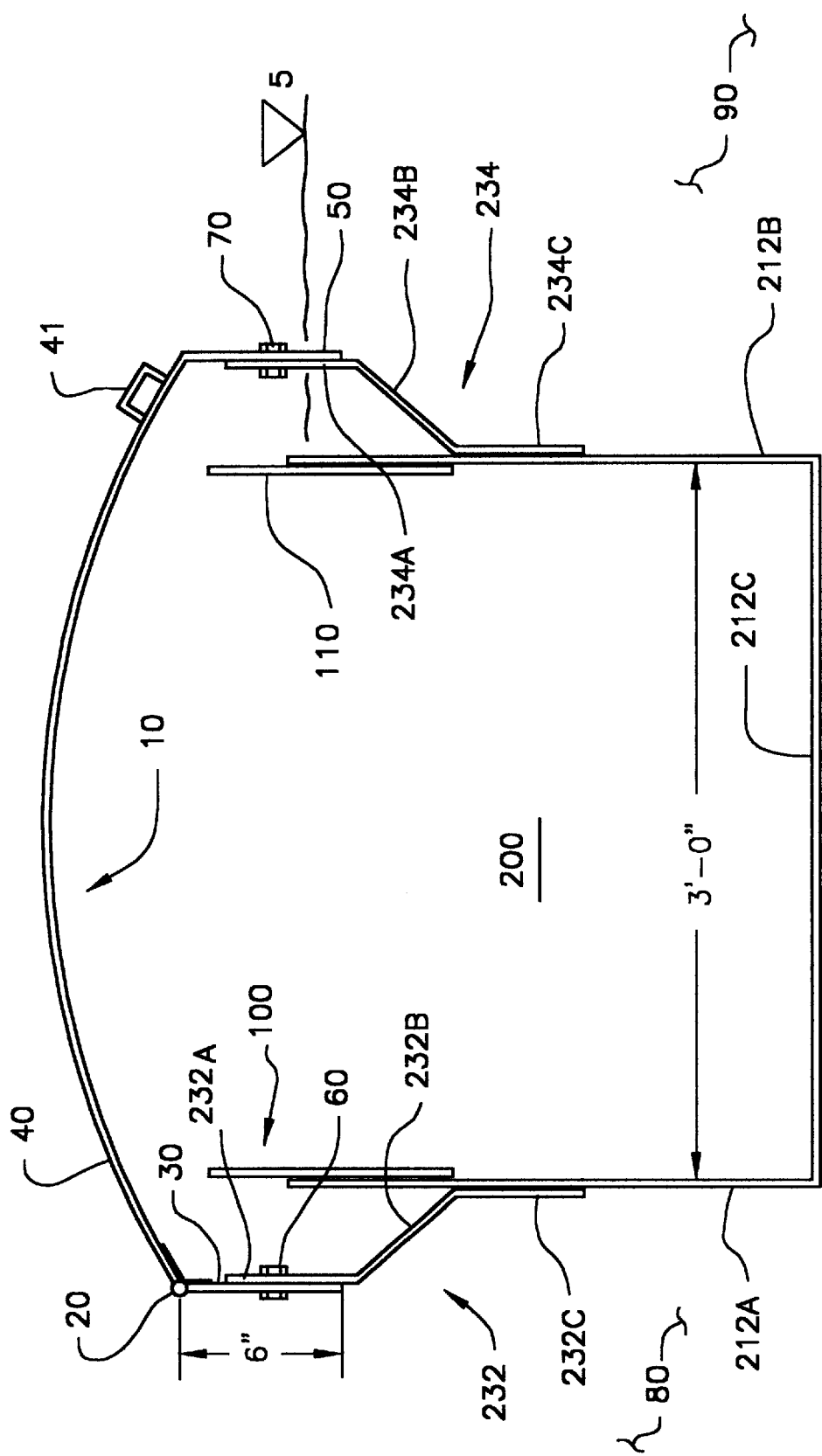
FIG. 1 is a cross-sectional side view of an inboard launder channel showing a cover panel member secured thereon in accordance with one embodiment of the invention.
Figure 2:
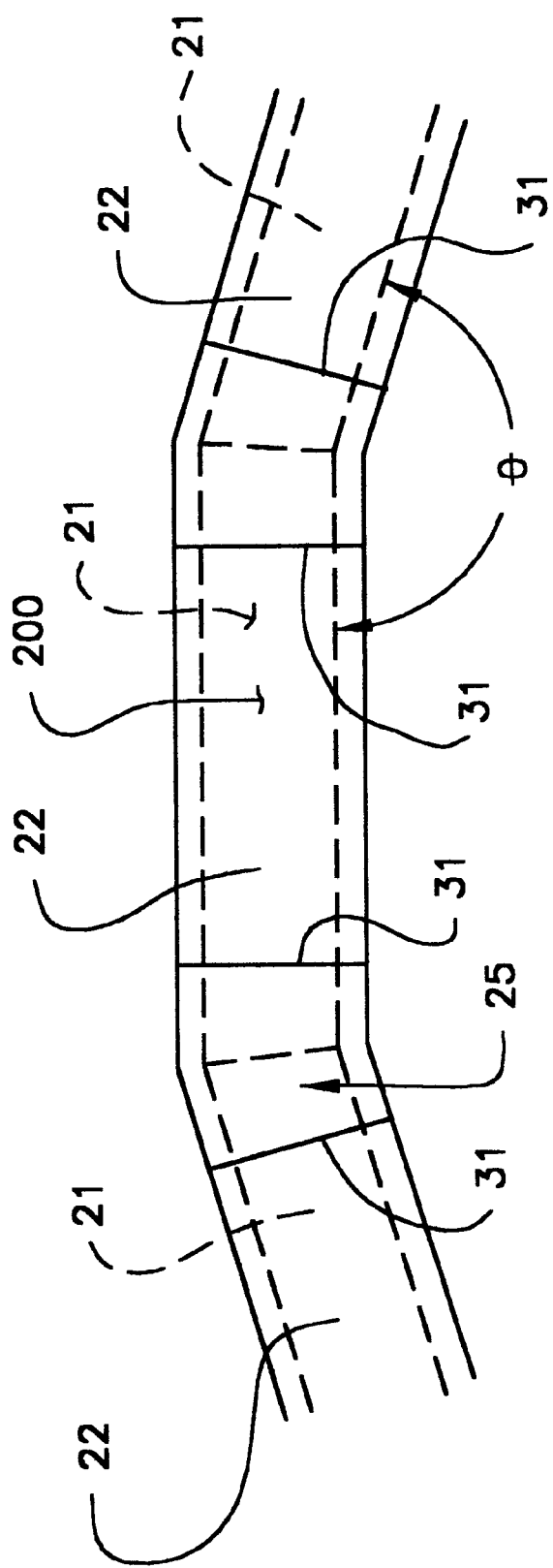
FIG. 2 is a plan view of several straight cover panel members located in an adjacent end-to-end fashion, seperated by fixed corner sections, in accordance with one embodiment of the invention.
Figure 3:
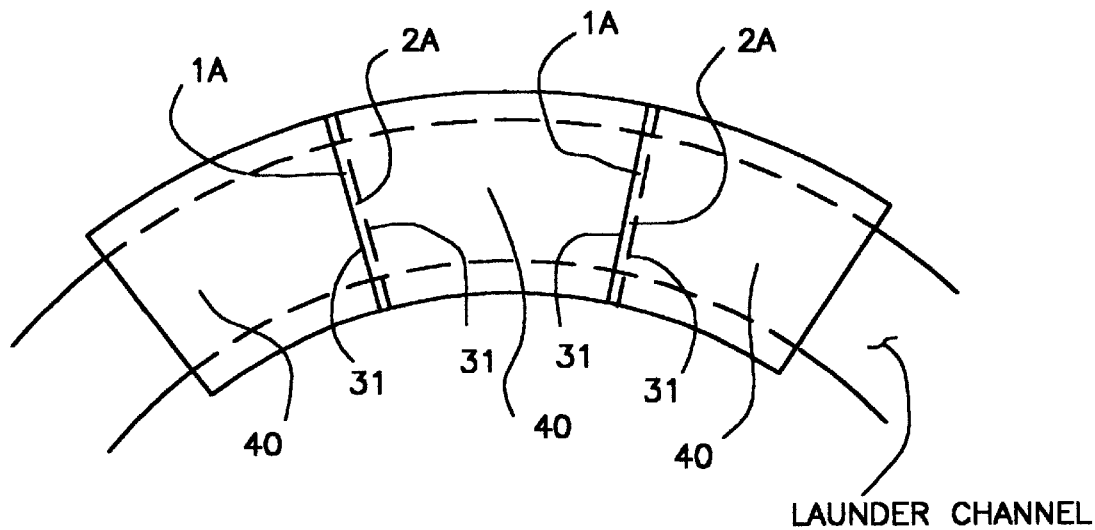
FIG. 3 is a plan view of several curved cover panel members located in an adjacent end-to-end fashion wherein the cover panel members, in accordance with one embodiment of the invention.

Reference is now made to FIG. 1 showing the cover system 10 of the present invention installed over the clean water flow or launder channel 200 of a clarifier or final sedimentation water treatment tank 12. In the embodiment depicted in FIG. 1, only one of the panel members of system 10 is shown. In accordance with the present invention, numerous panel members can be utilized and secured to launder channel 200. When installed in the position shown in FIG. 1, the panel members are dimensioned to completely cover launder channel 200. FIGS. 2 and 3, which will be explained fully later, show plan views of two embodiments of cover system 10, illustrating two ways in which the panel members of cover system 10 can be configured around an inboard launder channel.

As discussed previously, a principal object of the present invention is to prevent the growth of algae on the interior surfaces of launder channel 200. To this end, each cover panel member 40 comprises an opaque material which reflects and/or absorbs substantially all light incident thereon. In this regard, it will be readily appreciated that a wide variety of rigid or flexible materials may be utilized for the construction of the panel members. The panel members may, for example, be formed from metal or alloys thereof, fiberglass, or from substantially opaque thermosetting or thermoplastic materials. It is also possible, of course, to make the panel member opaque by applying a suitable coating, such as a light reflective or absorptive coating, to the exterior and/or interior surfaces thereof. In so doing, it is possible to utilize even transparent or translucent plastic materials to fabricate the panel members of the present invention.

In a currently preferred implementation, the individual covers are fabricated from a molded reinforced fiberglass composite. Each molded cover 10 incorporates a cover panel member 40, and, advantageously, an interior edge surface 30 and an exterior edge surface 50 to facilitate securing the panel member to the clarifier tank. Most preferably, the thickness of the fiberglass panels is in the range of about 3/16 to 3/4 of an inch, a range that provides substantial structural strength and rigidity while remaining sufficiently light weight for ease of installation. Each panel member can also be provided with a network of cross braces or other strengthening members (not shown) to enhance the rigidity to each panel member and provide a walkway surface capable of supporting one or more maintenance workers. Typically, such cross braces or other strengthening members can be fabricated out of a lightweight material such as balsa wood which can then be sandwiched between two or more layers of fiberglass. If desired, the upper surface of each panel member may be provided with a roughened, non-skid texture to prevent injury to such workers. Additionally, and as shown in FIG. 1, cover panel member 40 may be arcuate so as not to allow rain and snow to accumulate and puddle thereon.

As shown in FIG. 1, launder channel 200 is defined by first and second sidewalls 212a and 212b, and channel bottom 212c. As illustrated, sidewall 212a is the inner sidewall, as it is radially closer to the center of tank 12 and thus, is adjacent to interior edge surface 30 of cover panel member 40. Conversely, sidewall 212b is the outer sidewall, as it is radially farther from the center of tank 12 and thus, is adjacent to exterior edge surface 50 of cover panel member 40. Suitably fastened to first and second sidewalls 212a and 212b, by any conventional mechanical fastening means, are corresponding first and second weirs 100 and 110, respectively. Weirs 100 and 110 are typically V-notched at spaced intervals, to permit water flow therethrough.

As will be readily appreciated by those skilled in the art, a variety of fastening devices and techniques may be used to secure cover panel members 40 in position over launder channel 200. In the embodiment shown in FIG. 1, cover support brackets 232 and 234 are upwardly extending from sidewalls 212a and 212b and fasten to interior edge surface 30 and exterior edge surface 50, respectively. In the embodiment shown, cover support bracket 232 comprises three sections: a vertical section 232a which fastens to interior edge surface 30, a vertical section 232c which fastens to sidewall 212a, and an angled section 232b for connecting section 232a to 232c. In a similar fashion, cover support bracket 234 comprises three sections: a vertical section 234a which fastens to exterior edge surface 50, a vertical section 234c which fastens to sidewall 212b, and an angled section 234b for connecting section 234a to 234c. It can be appreciated that a plurality of cover support brackets 232 and 234 can be disposed around inner and outer sidewalls 212a and 212b of launder channel 200 at various intervals as desired. The number, size and strength of a plurality of cover support brackets 232 and 234 are determined by conventional mechanical strength analysis and will depend on the weight of the cover panel as constructed and whether the cover panels will be walked on by workers, thereby subjecting the brackets to increased weight loads. Regardless of the number, size and strength of the brackets chosen, however, the brackets should be narrow enough and located at adequate radially-spaced intervals to avoid substantial interference with the hydraulic flow therethrough. It can also be appreciated that cover support brackets 232 and 234 can be replaced by any conventional mechanical support elements in a variety of configurations, as long as the mechanical supporting means utilized secure cover panel system 10 in a position above launder channel 200 and do not substantial interfere with hydraulic flow.

In the illustrative embodiment shown in FIG. 1, water level 5 corresponds to the water level in tank 12. As previously discussed, and as well known in the art, cleaner water is located just below water level 5, as opposed to sediment-containing water which settles to the bottom of the tank. Water level 5 roughly corresponds to the bottom of the V-notch of weirs 100 and 110, as water will be displaced through the V-notch of weirs 100 and 110 as additional sediment-containing water enters tank 12. Not shown in FIG. 1, though usually employed by a clarifier tank and well known in the art, is a scum baffle. A scum baffle typically extends several inches above and several inches below water level 5 and extends along the length of the weir. The scum baffle prevents floatable scum which collects on top of water level 5 from being displaced through the weirs with the cleaner water. As shown, the bottom edges of interior edge surface 30 and exterior edge surface 50 extend below water level 5. Thus, interior edge surface 30 and exterior edge surface 50 perform the identical function as a scum baffle, and eliminate the need to build, maintain and clean the scum baffle. In the case of the inboard launder channel, which would ordinarily have a scum baffle located adjacent to both the inner and outer sidewalls of the launder channel, the illustrated embodiment eliminates the need for two scum baffles.

The top surface of each cover panel member 40 may be provided with handle means 41, which may protrude from or be recessed in cover panel member 40, for facilitating the installation, removal or opening of cover panel members 40. In the embodiment illustrated in FIG. 1, service personnel may easily open covers 40 by hand to access the launder channel for regular scheduled maintenance. In this embodiment, exterior edge surface 30 is rotatably mounted to cover panel 40 by means of a hinge 20. The end of cover panel 40 opposite interior edge surface 30, comprising exterior edge surface 50 attached to the edge of panel member 40, could then be rotatably lifted upward, providing access to launder channel 200. It should be noted that it is not required that hinge means 20 be located at interior edge surface 30, but could alternatively be located at exterior edge 50. In this case, handle means 41 would be located near to interior edge surface 30 and interior edge surface 30 could then be rotatably lifted upward to provide access to launder channel 200. In the preferred embodiment, hinge means 20 is fabricated from stainless steel to prevent corrosion.

The type of hinge 20 used by cover system 10 to rotatably mount interior edge surface 30 to cover panel member 40 is dependent upon the configuration of the cover system. For instance, in the configuration of cover panels shown in FIG. 2, a continuous hinge, extending from one lateral side 31 of a particular cover panel member 40 to the other lateral side 31 of the same cover panel member 40, can be utilized. In this configuration, hinge means 20 can be located at either interior edge surface 30 or exterior edge surface 50, as described previously.

FIG. 2 shows a plan view of launder channel 200 which, rather than being circular, comprises a plurality of straight sections 21 having an angle ø at the end of each section, relative to an adjacent section 211, such that all of the sections together enclose a polygon. In this configuration, fixed corner panel sections 25 are positioned over the angled corners formed by launder channel sections 21, and straight cover panel members 40 are disposed above straight sections 21 of launder channel 200.

Alternatively, in the previously described, circular configuration of cover panels shown in FIG. 3, a short hinge means 20 must be utilized, since the cover panel will open in a clam-like fashion. Preferably, short hinge means 20 would be located centrally at exterior edge surface 50, an equal distant from each of the two lateral sides 31 of the cover panel. In this embodiment, the lateral sides 31 of the cover panel would not stay closely disposed to interior edge surface 30 in the opened position. In the opened position, only that portion of the cover panel member 40 and interior edge surface 30 which are attached to the centrally located hinge means 20 remain closely disposed to each other. Lateral sides 31 of cover panel member 40 would separate from interior edge surface, thus making a continuous hinge means unpractical. Additionally, and unlike the previously described configuration of cover panels shown in FIG. 2, the circular configuration of cover panels shown in FIG. 3 is not compatible with hinge means located at interior edge surface 30.

As shown in the embodiment illustrated in FIG. 1, a quick release fastener 70 is utilized in order to prevent cover panel 10 from being rotatably lifted unintentionally. Quick release fastener 70 fastens exterior edge surface 50 of cover panel 40 to cover support bracket 234. Unless quick release fastener 70 is unfastened by the worker, access to launder channel 200 will not be possible. As will be appreciated, any type of removable quick release clips, pins or fasteners may be utilized for this purpose, so long as exterior edge surface 50 may be quickly disengaged from cover support bracket 234 for access when needed. For instance, a pin may be insertable through a hole in exterior edge surface 50 and through a similar sized hole in cover support bracket 234. It will also be appreciated that any number of pins or fasteners may be utilized with an individual cover panel member 40.

With reference to FIG. 1, it will be seen that the panel members of cover system 10 may be dimensioned and contoured to achieve a contiguous relationship with the interior surfaces of the launder channel and with each other. In the illustrative embodiment of the present invention, launder channel 200 of primary tank 12 has a sidewall configuration which is circular in the plan view (see FIG. 3). As seen in FIG. 3, each panel member defines an interior and an exterior edge surface having a radius of curvature corresponding to the radius of curvature of first and second sidewalls 212a and 212b of launder channel 200.

Figure 4:
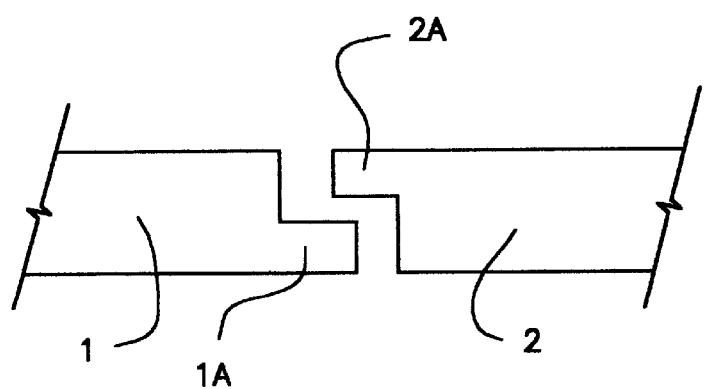
FIG. 4 is a cross sectional side view of two adjacent cover panel members to show the ship-lap type construction in accordance with one embodiment of the invention.

FIG. 4 shows the ship-lap type joint in accordance with one embodiment of the present invention. To prevent light from entering the channel between adjacent lateral edge surfaces 31 (as shown in FIGS. 2 and 3) of abutting panel members 40, ship-lap type lateral overlapping joints 1a and 2a are provided. Shiplap-type joints 1a and 2a can be integrally molded into each cover panel member 40 so that the adjacent-abutting panel members form a smoothly-continuous surface. Shiplap-type joints 1a and 2a allow for first lateral side 31 of cover panel member 40 to be secured to next lateral side 31 of adjacent cover panel member 40, so that together they form a smoothly-continuous surface. The overlapping of lateral sides 31 of cover panel members 40 also prevents unintended leakage or passage of particulate matter through the connection between the immediately-adjacent cover panel members, and eliminates a tripping hazard for workers.

Figure 5:
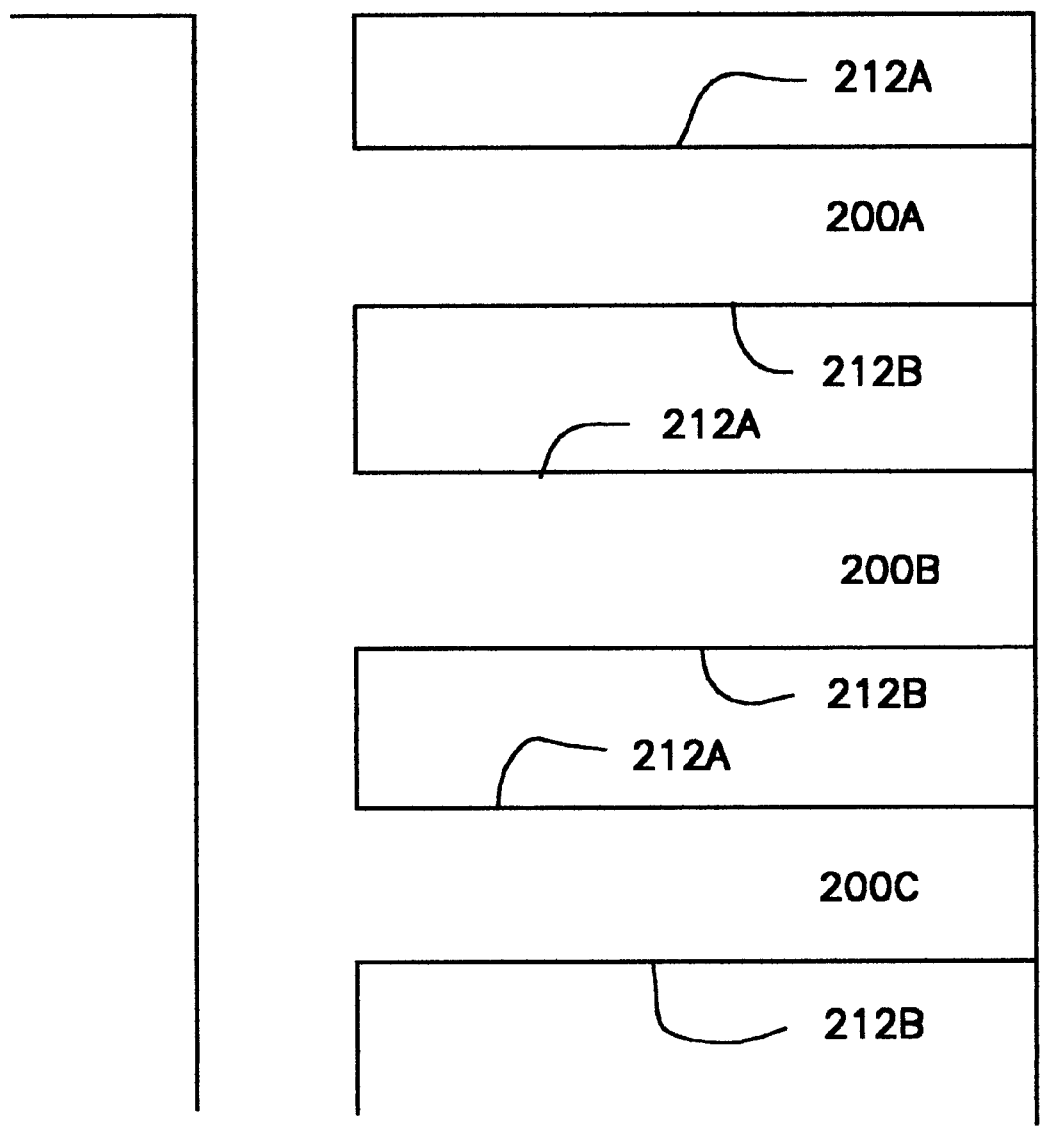
FIG. 5 is a plan view of a non-circular inboard launder configuration for a water treatment tank, as employed in accordance with one embodiment of the present invention.

FIG. 5 illustrates a non-circular, inboard launder channel configuration. In accordance with one embodiment, the present invention is suitable for use with this tank configuration. Launder channel 200a, 200b and 200c each permit water to flow into it over sidewalls 212a and 212b. Each launder channel 200a, 200b and 200c is connected to a main channel into which the clean water collects and flows to the next step in the treatment process. Similar to the other tank configurations previously discussed, the cover panels in this embodiment are supported by and coupled to the upper region of each sidewall, in order to prevent the growth of algae on the interior surfaces of the launder channel.

In addition to the principal object of preventing the growth of algae on the interior surfaces of the launder channel, spillway and weir, a further object of the present invention is to control the odor that may emanate from clarifier tank 12. It is recognized that a large percentage of the noxious gases generated in a settling tank are released as the clarified water spills over weirs 100 and 110. Accordingly, by capturing these hazardous gases in the launder channel region and drawing them off to a scrubber system or other gas processing apparatus (not shown) or to otherwise dispose of the gases, one is able to reduce the discharges of gases into the atmosphere to an acceptably safe level.

As shown in FIG. 1, when interior edge surface 30 and exterior edge surface 50 extend below water level 5, they act to seal launder channel 200 from the atmosphere. Pipes or ducts may be coupled to the sealed cover system 10 so that a fan or pump (not shown) in operation may draw off the noxious gases to a scrubber system. In this way, noxious gases emitted into launder channel 200 are prevented from being discharged into the atmosphere.

It would be understood that the preferred embodiments and examples described are for illustrative purposes only and are not to be construed as limiting the scope of the present invention which is properly delineated only in the appended claims.

What is claimed is:

1. A cover system for positioning over an inboard launder configuration of a clarifier water treatment tank apparatus having a water level, a central region and a peripheral region, said system comprising:

an inboard launder channel comprising a first sidewall located a first specified distance radially from said central region and disposed to receive a first water flow from said central region, said first sidewall having outer and inner sides, said outer side located outside said inboard launder channel, and a second sidewall located a second specified distance from said central region disposed to receive a second water flow from said peripheral region of said tank apparatus, said second specified distance being larger than said first specified distance, said second sidewall having outer and inner sides, said outer side being located outside said inboard launder channel;

first and second weirs coupled to said first and second sidewalls for controlling said first and second water flows over said sidewalls;

first and second cover supports, coupled to said outer sides of said first and second sidewalls; said first and second cover supports comprising un upper vertical section, an angled middle section, and a lower vertical section, said first lower vertical section is fastened to said first sidewall of said inboard launder channel and said second lower vertical section is fastened to said second sidewall of said inboard launder channel, said angled middle sections of said first and second cover supports connect said upper vertical portions and lower vertical portions of said first and second cover supports such that said upper vertical portions of said first and second cover supports are disposed away from said inboard launder channel, and said upper vertical sections of said first and second cover supports are coupled to said surface edges of the cover panel members;

a plurality of covers disposed above said inboard launder channel, each of said covers comprising a cover panel member, having an interior edge surface adjacent to said first sidewall, and an exterior edge surface adjacent to said second sidewall, said plurality of cover panel members having first and second substantially vertical support portions respectively coupled to said first and second cover supports by a hinge means coupled to said first substantially vertical upper support portion of said first cover support means and to said cover panel member, said hinge means allowing for pivoting said cover panel member toward and away from said launder channel about a pivot axis between a first closed position and a second open position so as to allow access to said launder channel.

2. The cover system of claim 1, wherein said first and second weirs are coupled to said first and second sidewalls of said inboard launder channel on said inner sides.

3. The cover system of claim 1, wherein said launder channel is substantially circular and said interior edge surfaces and said exterior edge surfaces of each said cover member define a radius of curvature corresponding to that of said launder channel.

4. The cover system of claim 1, wherein said interior edge surface and said exterior edge surface extend below said water level of said tank.

5. The cover system of claim 1, wherein said plurality of covers are each fabricated from a molded reinforced fiberglass composite.

6. The cover system of claim 1, wherein said plurality of covers comprises a single cover disposed above said inboard launder channel.

7. The cover system of claim 1, further comprising a plurality of handle means coupled to said cover panel members.

8. The cover system of claim 1, wherein said launder channel is comprised of a plurality of non-circular inboard launder channels, each of said plurality of channels disposed parallel to each other, and each of said plurality of channels comprising a first sidewall disposed to receive a first water flow, said first sidewall having outer and inner sides, said outer side located outside said inboard launder channel, and a second sidewall disposed to receive a second water flow, said second sidewall having outer and inner sides, said outer side being located outside said inboard launder channel.

9. The cover system of claim 1, wherein said cover support means extend from the side of said inboard launder channel up above the water line of said clarifier tank such that the hinge point between said cover panel members are located above said waterline of said clarifier tank.

10. The cover system of claim 1, wherein said upper vertical portion of said cover support means is bolted to said cover panel members.

11. The cover system of claim 10, wherein said upper vertical portion of said cover support means is bolted to said cover panel members at a point above said waterline of the said clarifier tank.

* * * * *